US009688187B1

(12) United States Patent
Conrad

(10) Patent No.: US 9,688,187 B1
(45) Date of Patent: Jun. 27, 2017

(54) ADJUSTABLE VERTICAL ATTACHMENT BETWEEN HOOD AND VEHICLE SIDE

(71) Applicant: Clifford Conrad, Kearny, NJ (US)

(72) Inventor: Clifford Conrad, Kearny, NJ (US)

( * ) Notice: Subject to any disclaimer, the term of this patent is extended or adjusted under 35 U.S.C. 154(b) by 191 days.

(21) Appl. No.: 14/681,040

(22) Filed: Apr. 7, 2015

(51) Int. Cl.
*B60Q 1/48* (2006.01)
*B60R 11/00* (2006.01)

(52) U.S. Cl.
CPC .............. *B60Q 1/484* (2013.01); *B60R 11/00* (2013.01); *B60R 2011/004* (2013.01)

(58) Field of Classification Search
CPC .... B60Q 1/2615; B60Q 1/2657; B60Q 1/484; B60R 11/00; B60R 2011/004; B62D 15/00; G09F 2017/0075
USPC ............... 116/28 R, 30; 33/264; 40/591, 592
See application file for complete search history.

(56) References Cited

U.S. PATENT DOCUMENTS

| | | | | |
|---|---|---|---|---|
| 1,771,817 A | | 7/1930 | Ragsdale | |
| 1,834,682 A | * | 12/1931 | Colstad | B60Q 1/2657 248/291.1 |
| 1,877,428 A | * | 9/1932 | Rensonnet | B60Q 1/484 224/42.31 |
| 1,964,873 A | * | 7/1934 | Dujardin | B60R 1/1207 248/200 |
| 2,121,525 A | * | 6/1938 | Johnson | B60Q 1/2657 116/28 R |
| 2,522,105 A | * | 9/1950 | Eisenman | B60Q 1/484 224/42.31 |
| 2,553,963 A | * | 5/1951 | Dzus | B62D 15/00 116/28 R |
| 2,664,634 A | * | 1/1954 | Giblin et al. | B60Q 1/484 248/225.11 |
| 2,672,841 A | * | 3/1954 | Nitzberg | B60Q 1/484 116/28 R |
| 2,827,704 A | * | 3/1958 | Hunsicker | A01B 69/001 172/430 |

(Continued)

FOREIGN PATENT DOCUMENTS

| | | | |
|---|---|---|---|
| DE | 4025904 C1 * | 10/1991 | ............... B60Q 1/26 |
| JP | 62006842 A * | 1/1987 | ............... B60Q 1/32 |

OTHER PUBLICATIONS

Illuminated Stainless-Steel Bumper Guides for Tow/Pick-up Trucks, http//www.trucktow.com/p-. Accessed on Feb. 9, 2015.

(Continued)

*Primary Examiner* — R. A. Smith
(74) *Attorney, Agent, or Firm* — Michael J. Feigin, Esq.; Feigin and Fridman LLC

(57) ABSTRACT

The disclosed technology describes a method and a pole mounting mechanism for marking the sides of a vehicle to serve as a guide for a student driver when maneuvering a vehicle during a driving lesson. The mechanism includes a shoe from which an adjustable pole extends. The disclosed technology also includes the method of attaching a pole mounting mechanism to each side of a vehicle hood adjacent to the fender and adjusting the poles, so they are substantially vertical with the surface on which the vehicle rests. In one embodiment, a tongue is fixedly attached to the one side of the shoe and extends to the opposite end of the shoe forming a gap, wherein the side of a vehicle hood may be inserted to frictionally attach the pole mounting mechanism to the hood.

6 Claims, 5 Drawing Sheets

(56) References Cited

U.S. PATENT DOCUMENTS

| | | | | |
|---|---|---|---|---|
| 3,287,548 A | * | 11/1966 | Kompier | B60Q 1/2657 116/28 R |
| 3,563,200 A | * | 2/1971 | Grossman | B60Q 9/003 116/28 R |
| 3,599,599 A | * | 8/1971 | Jones | E04H 12/32 116/173 |
| 3,657,821 A | * | 4/1972 | De Nure | B60W 30/12 33/263 |
| 3,762,360 A | * | 10/1973 | Hawes | B60Q 7/005 116/173 |
| 3,834,036 A | * | 9/1974 | Scarritt, Sr. | B62D 15/00 33/264 |
| 3,946,509 A | * | 3/1976 | McCaffrey | G09F 21/04 116/28 R |
| 3,998,285 A | | 12/1976 | Cooper | |
| 4,028,827 A | * | 6/1977 | Hufton | G09F 17/00 116/173 |
| 4,079,519 A | * | 3/1978 | Carmouche | B62D 15/00 33/264 |
| D248,284 S | * | 6/1978 | Bowser | D10/109.1 |
| 4,313,104 A | | 1/1982 | Phillips | |
| 4,677,753 A | * | 7/1987 | Loggers | B60Q 1/52 33/264 |
| 4,755,791 A | | 7/1988 | Kuroda | |
| 4,823,471 A | * | 4/1989 | Van Schaack | B62D 15/00 33/264 |
| 4,920,910 A | * | 5/1990 | Lin | G09F 17/00 116/173 |
| D313,214 S | * | 12/1990 | Phillips et al. | D10/110 |
| D341,551 S | * | 11/1993 | Jones | D11/166 |
| 5,320,322 A | * | 6/1994 | Williams | G09F 7/18 116/173 |
| 5,463,974 A | * | 11/1995 | Seeder | G09F 7/18 116/173 |
| D440,184 S | * | 4/2001 | Jones et al. | D11/166 |
| 6,318,288 B1 | | 11/2001 | Aspinwall et al. | |
| 6,345,587 B1 | | 2/2002 | Toscano | |
| 6,880,959 B2 | | 4/2005 | Houston | |
| 7,000,563 B2 | * | 2/2006 | Hensel | B60Q 1/484 116/209 |
| 7,228,814 B1 | * | 6/2007 | Williams, Sr. | G09F 17/00 116/173 |
| 7,543,545 B2 | * | 6/2009 | Matsumoto et al. | B60Q 1/484 116/28 R |
| 7,549,388 B1 | | 6/2009 | Arthur et al. | |
| 7,878,139 B1 | * | 2/2011 | Karnes et al. | G09F 17/00 116/173 |
| 9,010,000 B1 | * | 4/2015 | Rodriguez | G09F 21/048 40/592 |
| 2004/0154696 A1 | * | 8/2004 | Koncelik, Jr. | B60R 11/00 141/331 |
| 2008/0271661 A1 | | 11/2008 | Nestor | |
| 2014/0190013 A1 | | 7/2014 | Coviello | |

OTHER PUBLICATIONS

Rookie Poles, http://www.truckntow.com/p-10786-rookie-poles.aspx. Accessed on Feb. 9, 2015.

SnowBear Personal Plow, http://www.northerntool.com. Accessed on Feb. 9, 2015.

* cited by examiner

ADJUSTABLE VERTICAL ATTACHMENT BETWEEN HOOD AND VEHICLE SIDE

FIELD OF THE DISCLOSED TECHNOLOGY

The disclosed technology relates generally to a method and device for marking the sides of a vehicle to serve as a guide to a student driver when maneuvering a vehicle during a driving lesson.

BACKGROUND OF THE DISCLOSED TECHNOLOGY

Safety to persons and property is of paramount importance when a person is learning to drive. An inexperienced driver, such as a driving student, often does not have the skills to adeptly maneuver a vehicle, especially when parking. A student driver's lack of driving skills poses a threat to others and property as the student learns to drive. Driving aides facilitate a student driver's learning and promote safety. For instance, when parking a vehicle or maneuvering it in a confined space, a student driver would benefit from a marker or other delineation of the sides of the vehicle to serve as a guide. Driving aides are available in the market comprising poles which are mounted on the front or front corners of a vehicle. A problem with these existing driving aides, is that they are not readily installable, removable or transportable. The foregoing characteristics are especially beneficial when the student driver uses his or her own vehicle during a driving lesson. What is needed in the field of driver training, is an aide which marks the sides of a vehicle that is both easy to install and remove, and is readily transportable.

SUMMARY OF THE DISCLOSED TECHNOLOGY

The method and device in the disclosed technology meet existing needs in a number of ways, as the device for marking the sides of a vehicle is readily installable, removable and transportable. First, the pole mounting mechanism may comprise a shoe with an elongated dimension and depression centrally located along the elongated dimension with a dowel extending across the depression and into the shoe on either side of the depression. The shoe is substantially rectangular in shape, comprising two opposite elongated sides and two opposite shorter sides.

For the purposes of this specification "vehicle" may include car; sports utility vehicle; (also known as a SUV); pick-up truck; truck; or similar motorized transport. "Left side" of the vehicle refers to the side of a vehicle which would include the steering wheel and driver's seat, if the vehicle was bisected from front to rear, in a vehicle manufactured for use in the United States. "Right side" of the vehicle refers to the side of the vehicle opposite the left side of the vehicle, if the vehicle is bisected from front to rear, and includes the front passenger seat in a vehicle manufactured for use in the United States. The "front" of the vehicle refers to the half of the vehicle, bisected perpendicular to the right and left sides, which constitute the leading section of the vehicle when driven forward in a conventional manner. The "front" of the vehicle may also be defined as the half of the vehicle, bisected perpendicular to the right and left sides, which contains the steering wheel and engine in most vehicles. "Most" is defined as the majority, that is, anything over 50%. "Fender" is defined as the section of the vehicle surrounding a front tire, bounded by the front hood; the front door; and the bumper and headlights. The "hood" is defined as the substantially planar surface of the vehicle, parallel to the ground and above the front tires in most vehicles. The hood may be raised to expose the engine in most vehicles. The "bumper" is defined as the front section of the vehicle below the front headlights. The "headlights" are defined as the lights at the front of the vehicle which serve as the chief source of illumination of the area ahead under low light conditions. "Adjacent" is defined as abutting, contiguous or next to.

The term "shoe" is defined as a central base unit from which other components of the disclosed technology extend or are attached. "Pole" as used in this disclosure, is defined as a bar or elongated extending arm. The term "dowel" includes any one of or a combination of a peg, pin, or axle. "Dimension" includes "side" in reference to the shape of the shoe. A "dowel-pole assembly," for purposes of this disclosure, is a structure comprising the dowel, pole, and connection there-between. "Tongue" is defined as a thin and elongated member, that is flat or includes curves or waves. The "tongue" can be elastically deformable, so that when it is deformed under force, it returns to former position when the force is removed. "Elastically deformable" is further defined as a property of a structure, wherein the shape of the structure is distorted under force and the structure resumes its original shape when the force is removed. "Space" is also defined as a "gap." To avoid repetition, the "pole mounting mechanism" is synonymous with "mechanism."

The device may also include a pole adjustably extending from the dowel in a direction substantially perpendicular to the length of the dowel extending across the depression. The dowel-pole assembly may be located closer to one end of the elongated sides of the shoe.

A lower tongue can be fixedly attached to the bottom of the shoe along its shorter side, closest to the dowel-pole assembly. The lower tongue extends to the opposite shorter side of the shoe where the lower tongue may be spaced apart from the bottom of the shoe, forming a gap. The lower tongue may be curved or contain a curve in its longer dimension. The elongated sides of the shoe and the elongated sides of said lower tongue, are substantially aligned with each other.

In one embodiment, a car hood is wedged between the gap between the shoe and the lower tongue of the pole mounting mechanism.

In another embodiment, the pole of said pole mounting mechanism is moved relative to said dowel until said pole is substantially in a vertical direction with respect to a surface on which a car comprising said car hood rests.

The disclosed technology may include the method of delineating the sides of a vehicle, comprising the steps of: exposing the side edges of a vehicle hood; attaching a pole mounting mechanism to one side of the hood adjacent to the fender; and attaching a second pole mounting mechanism at a substantially similar location on the opposite side of the hood, adjacent to the fender, as the first said pole mounting mechanism.

In a further embodiment the pole mounting mechanism may be attached to a vehicle hood with an elastically deformable tongue attached to one end of the bottom of the pole mounting mechanism. The tongue extends to the opposite end of said mechanism forming an opening through which the edge of the hood of said vehicle is inserted, frictionally attaching said mechanism to said hood.

"Substantially" and "substantially shown," for purposes of this specification, are defined as "at least 90%," or as otherwise indicated. Any device may "comprise" or "consist of" the devices mentioned there-in, as limited by the claims. "Generally" for purposes of this specification, is defined as "at least 75%," or as otherwise indicated.

It should be understood that the use of "and/or" is defined inclusively such that the term "a and/or b" should be read to include the sets: "a and b," "a or b," or

DETAILED DESCRIPTION OF EMBODIMENTS OF

THE DISCLOSED TECHNOLOGY

The disclosed technology described herein includes a pole mounting mechanism for marking the sides of a vehicle to serve as a guide to a student driver when maneuvering a vehicle during a driving lesson. A mechanism may be attached to each side of the vehicle's hood adjacent to the fender. The mechanism includes a shoe from which an adjustable pole extends. The pole of the mechanism may be adjusted to be in a vertical position with respect to the surface on which the vehicle rests. In one embodiment, a tongue is fixedly attached to the one side of the shoe and extends to the opposite end of the shoe forming a gap, wherein the side of the hood may be inserted to fixedly attach the pole mounting mechanism to the hood.

A method of use is also disclosed, wherein a mechanism may be attached to each side of a vehicle's hood adjacent to the fender. The poles of the mechanisms may be adjusted so they are substantially vertical with the surface on which the vehicle rests. The poles identify or mark the side edge of the vehicle to serve as points of reference for the driver when maneuvering the vehicle.

Embodiments of the disclosed technology will become clearer in view of the following discussion of the figures.

Figure 1:
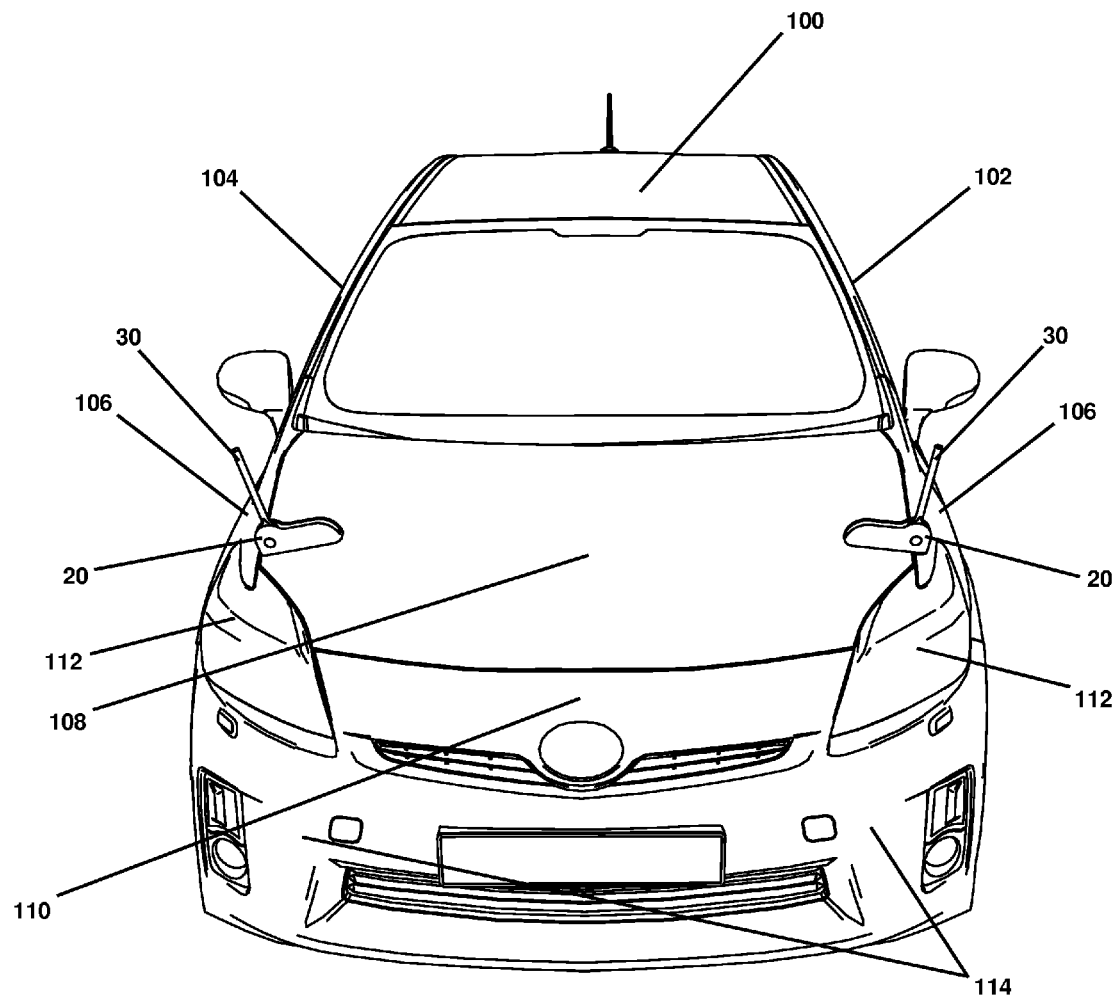
FIG. 1 shows a front perspective view of a car equipped with the pole mounting mechanism.

FIG. 1 shows a front perspective view of a vehicle equipped with two generally vertically extending poles, on the right side of a vehicle and left side thereof. The vertically extending poles can extend in a true vertical direction, relative to the ground and/or top of the car at the hood 108 and/or relative to the seat of a driver in the car 100. Or, the poles can extend generally or substantially vertical. In order to ensure that the poles extend vertically (or substantially vertically), the poles 30 can be rotated with respect to a shoe 20, as will be discussed further below with reference to FIG. 2.

Still referring to FIG. 1, the mechanism can be attached to the front of the vehicle 110 between the front fender 106 and hood 108, wherein the fender 106 is the section of the vehicle surrounding a front tire and bounded by the front bumper 114, headlight 112, hood 108 and front door.

Figure 2:
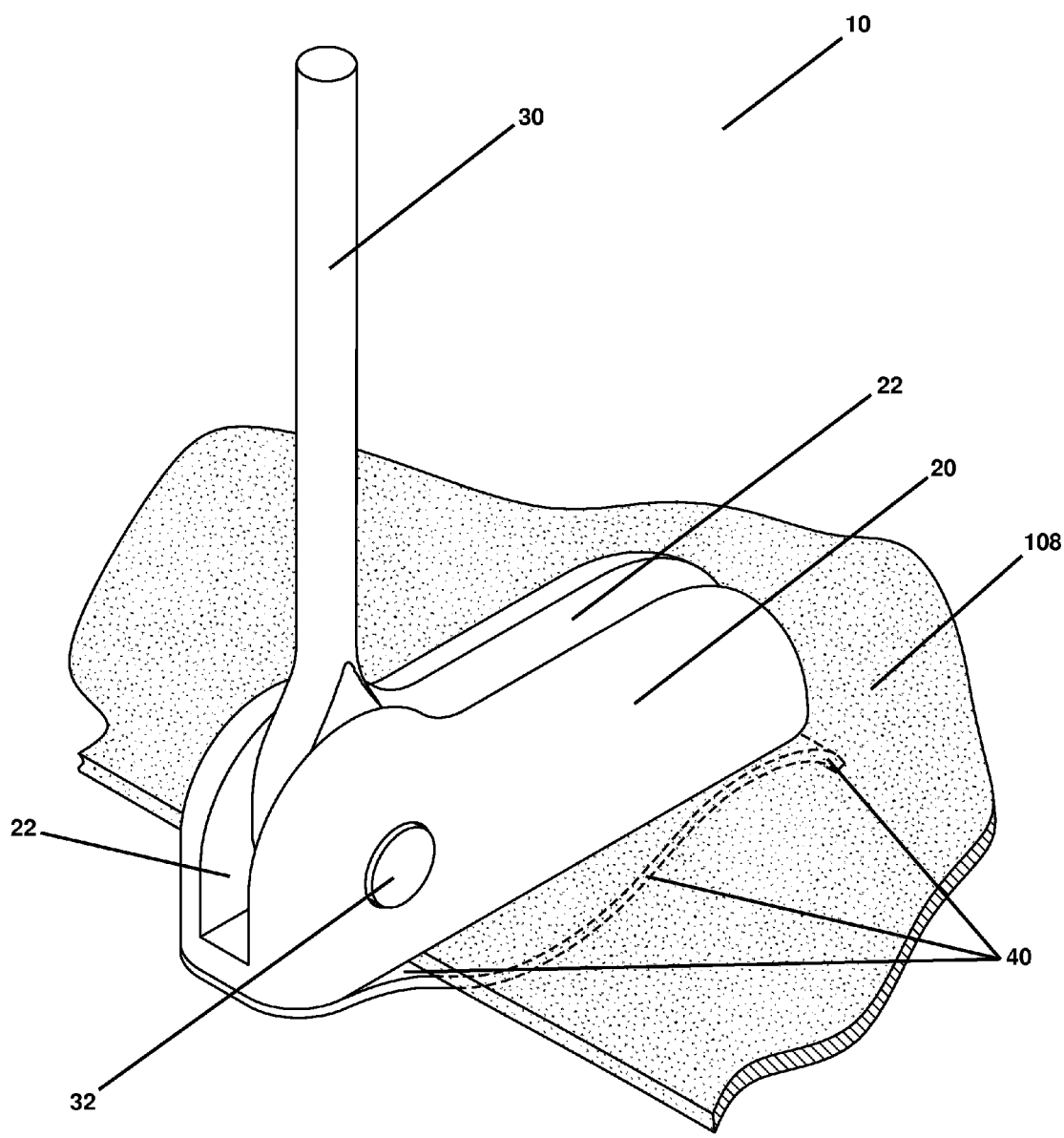
FIG. 2 shows a side perspective view of the pole mounting mechanism installed on the vehicle hood.

FIG. 2 shows a side perspective view of the pole mounting mechanism installed on the vehicle hood. The pole 30 can be attached to the shoe 20 with a dowel 32. A slot 22 in the shoe 20, rotationally engages the pole 30, the rotation thereof being about the dowel's 32 axis. An elastically deformable tongue 40 is fixedly attached on one end to the end of the shoe 20, closet to the dowel 32. A space exists between the opposite end of the tongue 40 and the bottom of the shoe 20, which permits entry of the edge of a vehicle hood 108. In one embodiment of the invention, the mechanism 10 is attached to the side of the hood 108, by opening the hood to expose the sides adjacent to the fenders 106. The mechanism 10 is then slid onto the side of the hood 108, adjacent to the fender, through the gap between the shoe 20 and the tongue 40. The gap 42 is more clearly shown in FIG. 4 below. The elastically deformable property of the tongue 40 frictionally attaches the shoe 20 on the hood 108 by compressing the hood between said shoe 20 and tongue 40. The mechanism may be attached to the hood by any means known in the art which is suitable for or compatible with the disclosed technology. Such other possible methods of attachment include clamps, bolts, rivets, screws, or brackets.

Figure 3:
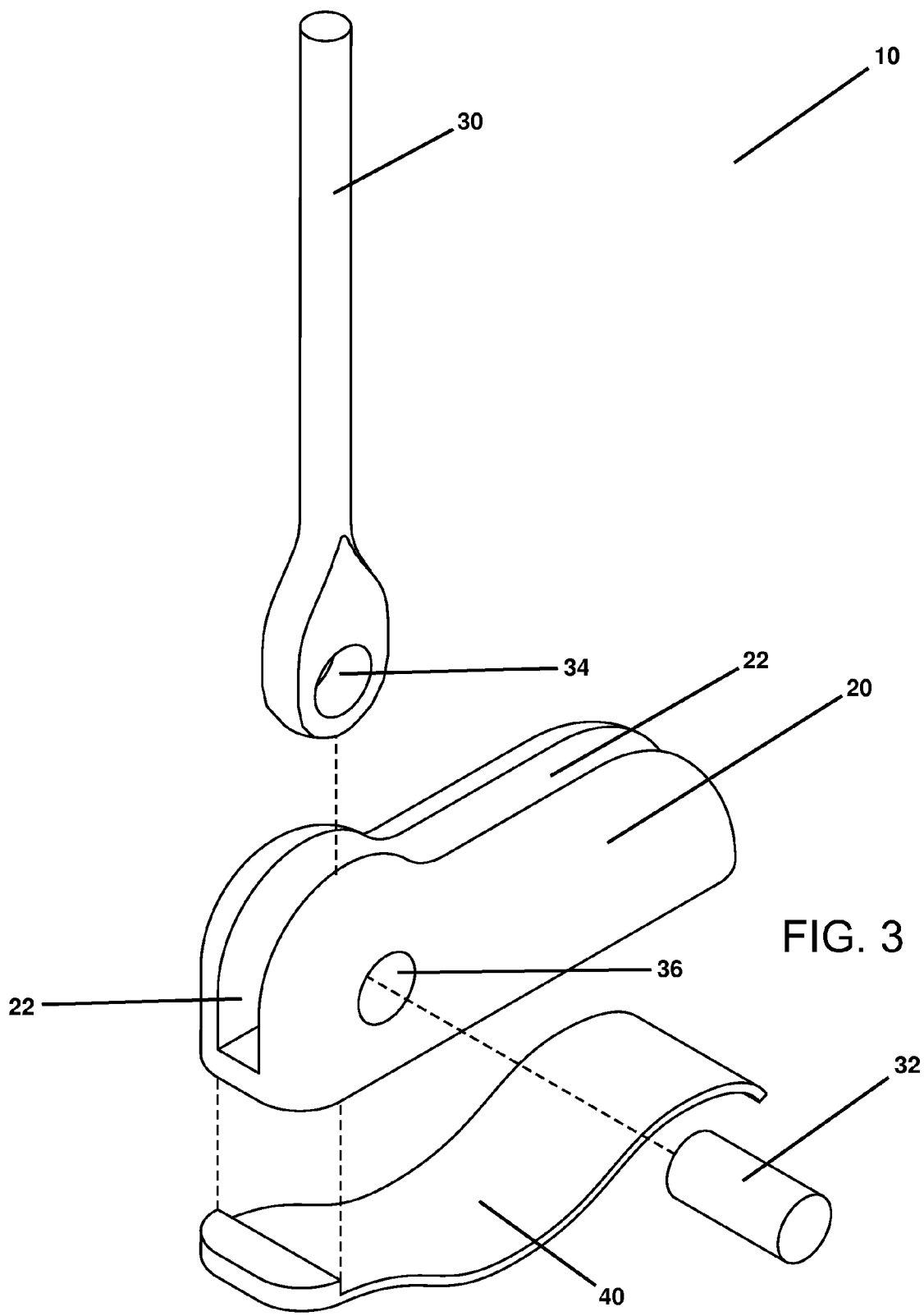
FIG. 3 shows an exploded view of the pole mounting mechanism.

FIG. 3 shows a side perspective exploded view of the pole mounting mechanism 10. The pole 30 may include a circular portal 34 on one end. The pole portal 34 can be aligned with a corresponding portal 36 on the shoe 20. A dowel 32 can be inserted through the shoe portal 36 and pole portal 34 thereby fixedly attaching the bar 30 to the shoe 20. A tongue 40 may be fixedly attached to the end of the shoe 20 closest to the dowel 32. The tongue 40 extends to the opposite end of the shoe 20 where it forms a gap 42, as more precisely shown in FIG. 4, between the bottom of the shoe 20 and tongue 40.

Figure 4:
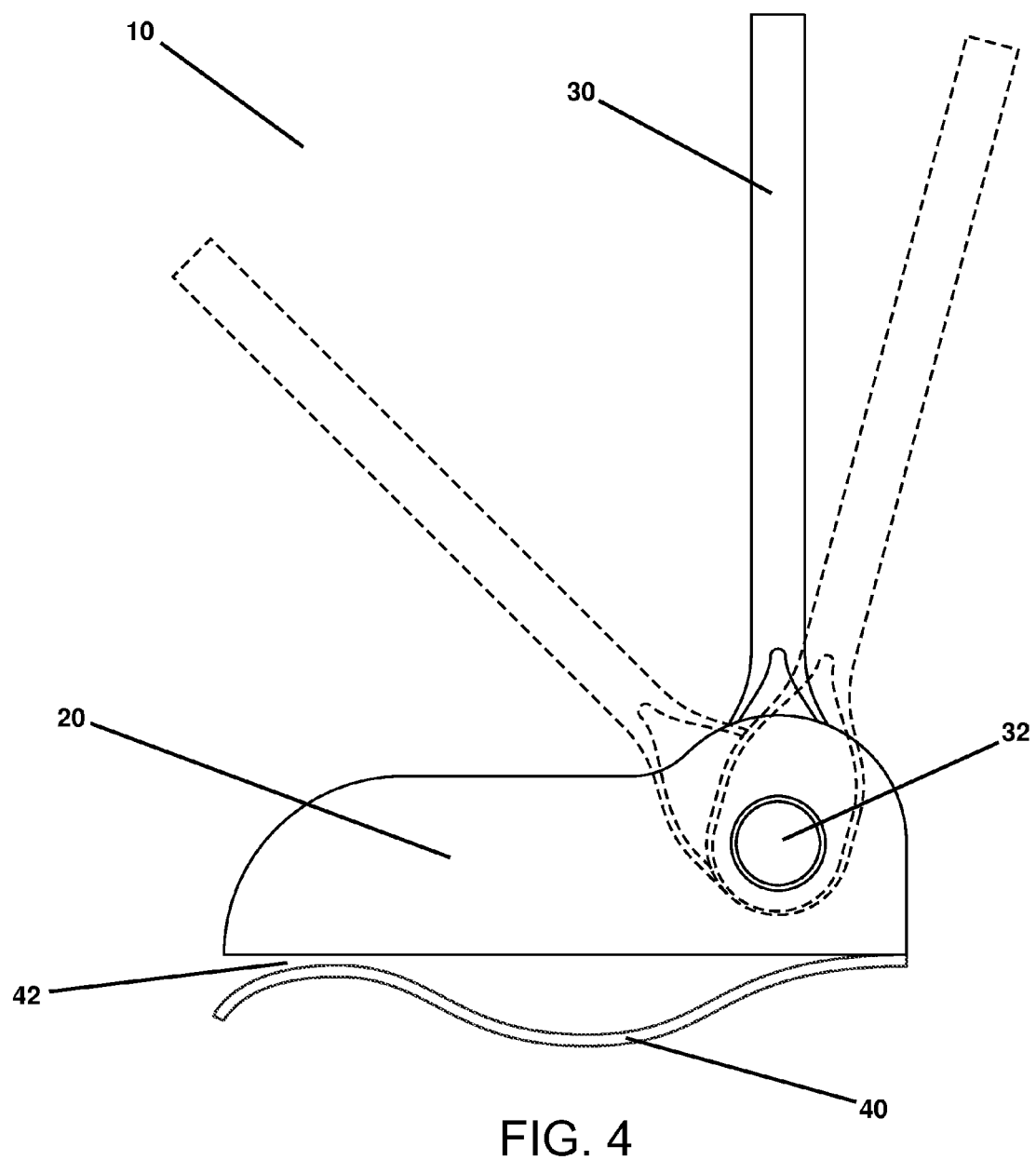
FIG. 4 shows a side elevation view of the pole mounting mechanism and rotational properties of the pole.

FIG. 4 shows a side elevation view of the pole mounting mechanism 10 and rotational properties of the pole 30. The pole 30 may rotate around the axis formed by the dowel 32. A tongue 40 may be fixedly attached to one end of said shoe 20 closest to the dowel 32. The opposite end of the tongue 40 may form an opening 42 with the opposite end of the shoe 20.

Figure 5:
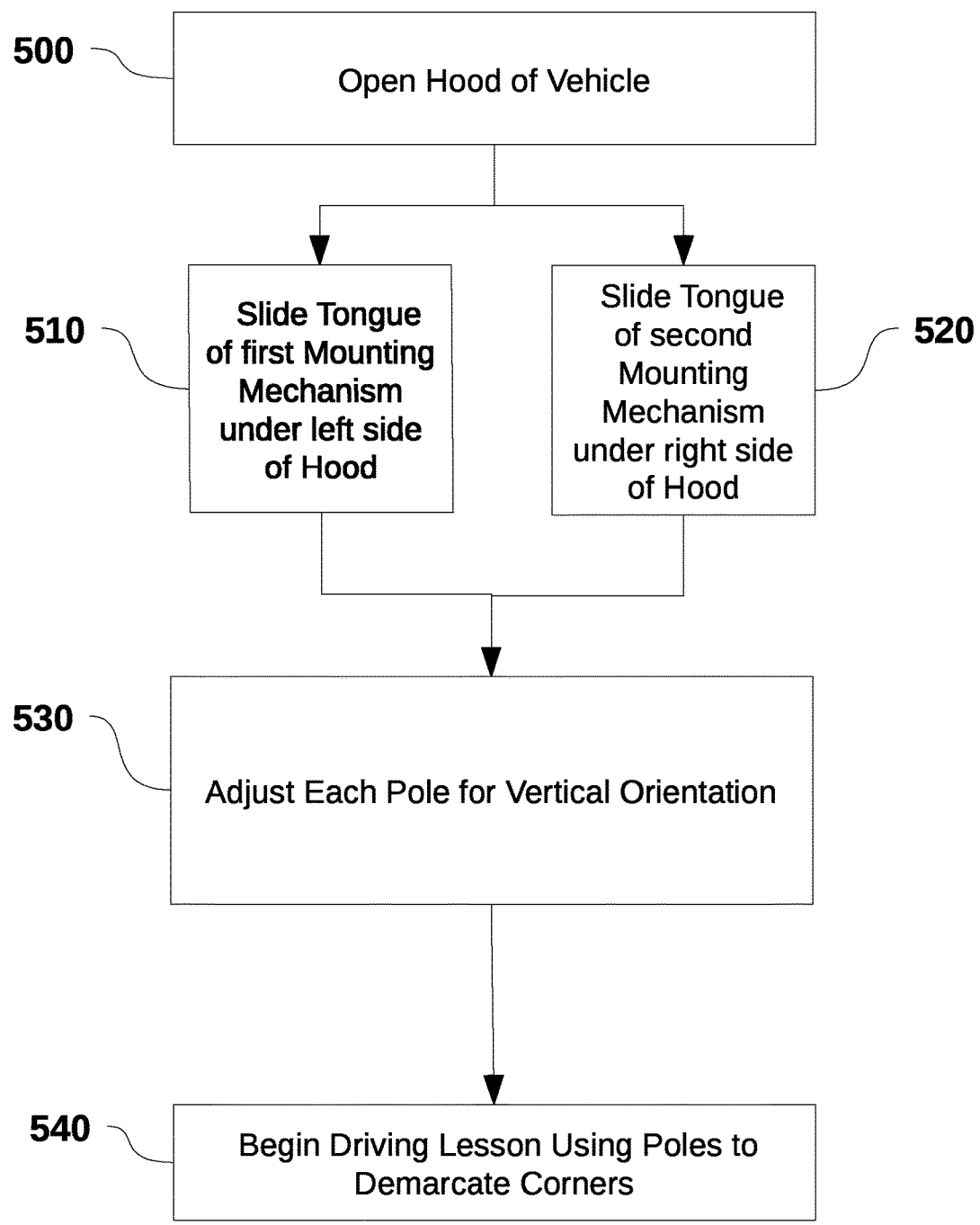
FIG. 5 is a flow chart depicting the method of using the pole mounting system.

FIG. 5 is a flow chart depicting the method of using the pole mounting system. In step 500, the hood 108 of a vehicle 100 is opened exposing the sides of the hood 108 adjacent to the fenders 106 of a vehicle 100. Then, in either or both of steps 510 and 520, a pole mounting device is attached to the hood by inserting the side of the hood adjacent to a fender into the gap between the shoe and the tongue of the pole mounting device. For example, this can pertain to the fender 106 and hood 108, with respect to the left side of the vehicle 102 (in step 510) and the right side of the vehicle 104 (in step 520). This is further accomplished by sliding a tongue, such as tongue 40, under the hood while the shoe 20 slides over the top of the hood 108. The elastically deformable property of the tongue results in the compression of the tongue 40 against the hood 108 and shoe 20, which frictionally holds the pole mounting mechanism 10 in place. In step 530, the poles are adjusted to point in a vertical direction (with reference to the top of the car, the angle of the driver in the driver's seat, and/or the angle of the ground on which the vehicle sits). For example, the poles 30 on the pole mounting mechanism 20 are adjusted so that the poles 30 are substantially vertical with respect to the surface on which said vehicle 100 rests. Then, in step 540, the vehicle 100 may then be operated using the poles 30 as markers or reference points for the vehicle sides 102/104, when maneuvering said vehicle 100. One skilled in the art will recognize that an implementation of an actual device will contain other components as well, and that FIG. 3 is a high level representation of some of the components of such a device for illustrative purposes. It should also be understood by one skilled in the art that the method and devices depicted in FIGS. 1, 2, 4 and 5 may be implemented on a device such as is shown in FIG. 3.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods and apparatuses described hereinabove are also contemplated and within the scope of the invention.

The invention claimed is:

1. A pole mounting mechanism, comprising:
   an elongated shoe including a first portion having a first height and a second portion having a second height, said first height greater than said second height, said shoe having a slot extending through an elongated side thereof within said first portion and said second portion;
   a dowel extending across said slot and into either side of said shoe at said first portion of said shoe;
   a pole adjustably extending from said dowel in a direction substantially transverse to both said elongated side of said shoe and said direction of said extending of said dowel; and
   a frictional attachment mechanism; said frictional attachment mechanism further comprising:
   an elastically deformable outwardly and inwardly curved lower tongue fixedly held to said shoe at a first end of an elongated side of said lower tongue and a first end of said elongated side of said shoe;
   a second end of said elongated side of said lower tongue spaced apart from said shoe;
   wherein said elongated sides of said shoe and said elongated sides of said lower tongue are substantially aligned with each other.

2. The pole mounting mechanism of claim 1, wherein a car hood is wedged between said shoe and said lower tongue of said pole mounting mechanism.

3. The pole mounting mechanism of claim 1, wherein said pole is movable relative to said dowel until said pole is substantially in a vertical direction with respect to a surface on which a car comprising said car hood rests.

4. The pole mounting mechanism of claim 1, wherein the dowel-pole assembly is located closer to one end of the elongated sides of said shoe.

5. A method of delineating the sides of a vehicle comprising the steps of:
   exposing the side edges of a front hood of said vehicle;
   attaching a first elongate pole mounting mechanism to one side of said front hood, adjacent to a first fender of said vehicle, such that an elongate side of said first pole mounting mechanism is substantially perpendicular to a side of said vehicle;
   attaching a second elongate pole mounting mechanism to an opposite side of said hood adjacent to a second fender of said vehicle, such that an elongate side of said second pole mounting mechanism is substantially perpendicular to a side of said vehicle, and substantially aligned with said first pole mounting mechanism;
   adjusting said poles of each said first and second pole mounting mechanism so that each said pole is in a substantially vertical position in relation to a surface on which said vehicle rests; and
   operating or directing another to operate said vehicle using the poles as a point of reference to identify sides of said vehicle.

6. A method of delineating the sides of a vehicle comprising the steps of:
   exposing the side edges of a front hood of said vehicle,
   attaching a first elongate pole mounting mechanism to one side of said front hood adjacent to a first fender of said vehicle such that an elongate side of said first pole mounting mechanism is substantially perpendicular to a side of said vehicle, wherein said first pole mounting mechanism is frictionally held between the fender and hood of said vehicle by way of an elastically deformable tongue of said first pole mounting mechanism placed below said front hood, wherein said tongue is attached to one end of the elongated sides of the first pole mounting mechanism and the opposite end of the tongue forming an opening with the opposite end of said mechanism through which the edge of said front hood is inserted, frictionally attaching said mechanism to said front hood;
   attaching a second pole mounting mechanism to an opposite side of said hood at a position equidistant to a center point of said hood as said first pole mounting mechanism and adjacent to a second fender of said vehicle by way of a shoe and elastically deformable tongue of said second pole mounting mechanism, such that an elongate side of said second pole mounting mechanism is substantially perpendicular to a side of said vehicle, and substantially aligned with said first pole mounting mechanism;
   adjusting said poles of each said pole mounting mechanism, so that each said pole is in a substantially vertical position in relation to a surface on which said vehicle rests; and
   operating or directing another person to operate the vehicle using the poles as a point of reference to identify sides of said vehicle.

\* \* \* \* \*